No. 757,932. PATENTED APR. 19, 1904.
W. A. JONES.
SHAFT FASTENER.
APPLICATION FILED AUG. 13, 1903.
NO MODEL.
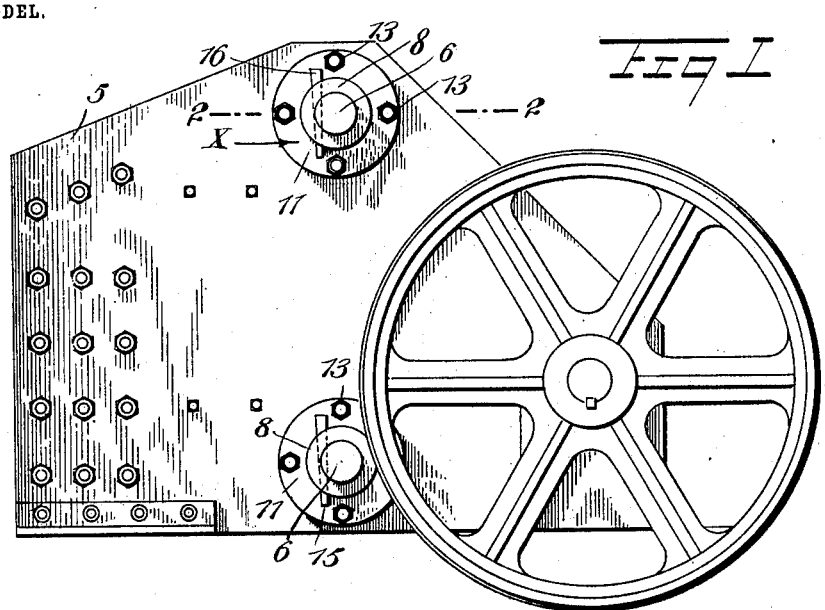
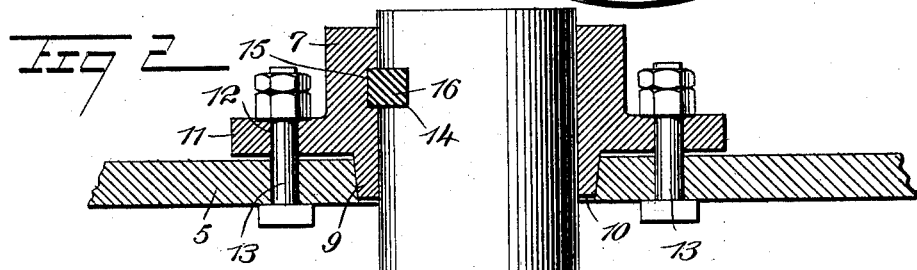
WITNESSES:
H. Walker
INVENTOR
William A. Jones
BY
Munn
ATTORNEYS No. 757,932.

Patented April 19, 1904.

UNITED STATES PATENT OFFICE.

WILLIAM ARTHUR JONES, OF BRANCH, PENNSYLVANIA.

SHAFT-FASTENER.

SPECIFICATION forming part of Letters Patent No. 757,932, dated April 19, 1904.

Application filed August 13, 1903. Serial No. 169,313. (No model.)

*To all whom it may concern:*

Be it known that I, WILLIAM ARTHUR JONES, a citizen of the United States, and a resident of Branch, in the county of Westmoreland and State of Pennsylvania, have invented a new and Improved Shaft-Fastener, of which the following is a full, clear, and exact description.

My invention relates to means for fastening shafts in machinery, such as in stone-crushers and other heavy machines wherein the shaft is subjected to excessive jar and strain.

The object that I have in view is the provision of substantial and simple means by which a shaft may be secured solidly and immovably in position within the frame of heavy machinery.

Further objects and advantages of the invention will appear in the course of the subjoined description and the actual scope thereof will be defined by the annexed claims.

Reference is to be had to the accompanying drawings, forming a part of this specification, in which similar characters of reference indicate corresponding parts in both the figures.

Figure 1 is a side elevation of a portion of a stone-crushing machine having certain of its shafts equipped with fastening means of my invention, and Fig. 2 is an enlarged horizontal sectional view in the plane of the dotted line 2 2 of Fig. 1.

In order that others skilled in the art may understand my invention, I have shown the same in connection with a portion of a stone crushing or breaking machine; but it will be understood that I do not desire to strictly confine myself to the special application of the invention to machines of this particular type, because I am aware that the invention may be used in connection with any kind of machinery wherein the shaft is to be fastened immovably in place to prevent its displacement by the jar or vibration to which the machine is exposed when in service.

In the drawings, 5 designates the sides of a frame forming a part of a stone-crushing machine, and 6 is a shaft which extends transversely across the frame and through the sides thereof.

The invention contemplates the employment of bushings 7 8, which are applied to the outer faces of the respective sides 5 of the machine. Each bushing is provided at its inner end with an externally-conical hub 9, the latter being disposed to fit in a tapered opening 10, which is produced in the sides 5 of the machine-frame. The bushing is also provided with an annular flange 11, which is pierced at intervals to produce bolt-holes 12. Said bushing is fastened adjustably to the side 5 by a series of bolts 13, which pass through the side and the holes 12 of the flanged bushing, whereby the bushing may be drawn against or within the side 5, so that its conical hub will bind in the tapering opening of said frame side. The bushings 7 8 are fastened adjustably to the sides of the frame to have coaxial relation, and through these bushings and the conical hubs thereof are extended the end portions of the heavy shaft 6. This shaft is provided near its end portions with key-seats 14, and through the bushings 7 8 are provided key-passages 15, the latter being placed to have registering relation to the key-seats 14 of the shaft. The shaft is held immovably in place within the bushings by the employment of the tapering keys 16, which are driven into the slots or openings which are formed by the coincident key-seats 14 of the shaft and 15 of the bushings. (See Fig. 2.) The shaft 6 is provided near one end with a shoulder 17, which has abutting engagement with the inner end portion of the conical hub on one of the bushings—as, for example, the bushing 8. (Shown by Fig. 2.)

From the foregoing description, taken in connection with the drawings, it will be seen that the bushings are adapted to be fastened tightly to the sides 5 of the frame by fitting the conical hubs 9 thereof in the tapering openings 10, after which the nuts on the bolts 13 may be tightened for the purpose of clamping the bushings immovably to the sides 5. The shaft 6 is adapted to be fitted in the bushings for its shoulder 17 to engage with one bushing 8, and finally the keys 15 are driven into place, so as to hold the shaft immovably in position within the bushings and across the frame. The keys 15 are disposed on one side of the shaft, said keys being located on the opposite side of the shaft from that on which the strain or pressure is exerted. In Fig. 1 the direction of the thrust or pressure is indicated by the arrow X, from which it will be seen that the right-hand side of the shaft is forced against the bushings, while the keys are located on the left-hand side of the shaft. This is advantageous, because the shaft is not weakened on the side which sustains the greatest pressure for the reception of the key.

Having thus described my invention, I claim as new and desire to secure by Letters Patent—

1. A means for fastening shafts immovably in place in machinery, consisting of a suitable machine-frame, bushings bolted to the machine-frame and having wedging engagement therewith, a shaft supported in said bushings, and keys for interlocking the shaft to the bushings.

2. A means for fastening shafts immovably in machinery, consisting of a suitable machine-frame, bushings having conical hubs which are wedged into the machine-frame, bolts fastening the bushings in place, a shaft fitted in said bushings, and means for locking the shaft to the bushings.

3. A means for fastening shafts immovably in machinery, consisting of a suitable machine-frame, bushings having conical hubs and perforated flanges, bolts passing through said flanges and drawing the conical hubs into wedging engagement with a machine-frame, a shaft fitted in said bushings, there being key-seats in the shaft and the bushings, and keys occupying said key-seats and locking the shaft immovably in place within the bushings.

In testimony whereof I have signed my name to this specification in the presence of two subscribing witnesses.

WILLIAM ARTHUR JONES.

Witnesses:
M. V. MAXTON,
CHAS. H. McLAUGHLIN.